United States Patent [19]

Dugger et al.

[11] Patent Number: 4,651,817
[45] Date of Patent: Mar. 24, 1987

[54] HEAT EXCHANGE APPARATUS USEFUL FOR MELTING SULFUR

[75] Inventors: Michael N. Dugger; Jack S. Hampton, both of Lake City, Fla.

[73] Assignee: Occidental Chemical Agricultural Products, Inc., White Springs, Fla.

[21] Appl. No.: 345,969

[22] Filed: Feb. 5, 1982

[51] Int. Cl.⁴ .............................................. F28F 5/00
[52] U.S. Cl. .................................... 165/86; 165/133; 165/41; 165/142
[58] Field of Search ................... 165/142, 48, 41, 133, 165/86; 126/343.5 S, 343.5 R; 239/433, 525, 530; 414/163, 786; 405/131, 258

[56] References Cited

U.S. PATENT DOCUMENTS

| 752,449 | 2/1904 | Greenway | 414/375 |
| 2,095,627 | 10/1937 | Burns | 239/433 |
| 2,672,032 | 3/1954 | Towse | 165/142 |
| 3,319,709 | 5/1967 | Strunk | 165/142 X |
| 3,500,900 | 3/1970 | Kupka | 165/47 |
| 4,203,625 | 5/1980 | Ellithorpe et al. | 299/6 |

FOREIGN PATENT DOCUMENTS

| 567456 | 12/1932 | Fed. Rep. of Germany | 165/142 |
| 2911425 | 9/1980 | Fed. Rep. of Germany | 165/142 |
| 197811 | 5/1923 | United Kingdom | 165/142 |

Primary Examiner—Allen M. Ostrager
Attorney, Agent, or Firm—James F. Tao; William G. Gosz

[57] ABSTRACT

A steam lance, which is useful to melt solid sulfur in the outlet underneath a sulfur tank car containing molten sulfur, comprises (in operative relationship) tip means for contacting a material to be heated (e.g., solid sulfur); conduit means for conducting heat exchanging fluid to, or to and from, said tip means; and pivot means disposed in an operative relationship therewith for pivotally supporting said conduit means to enable the application of force to said conduit means to urge said tip means against or into said material to be heated.

18 Claims, 7 Drawing Figures

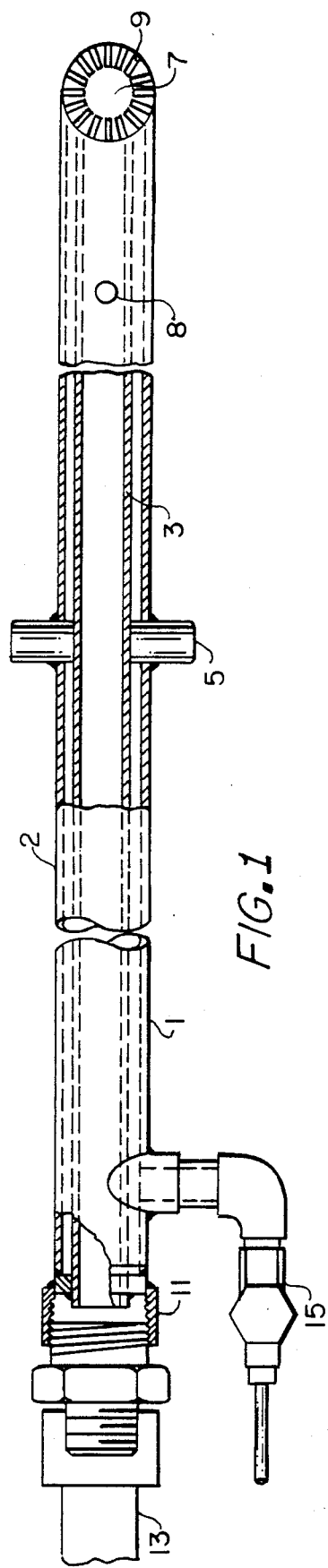
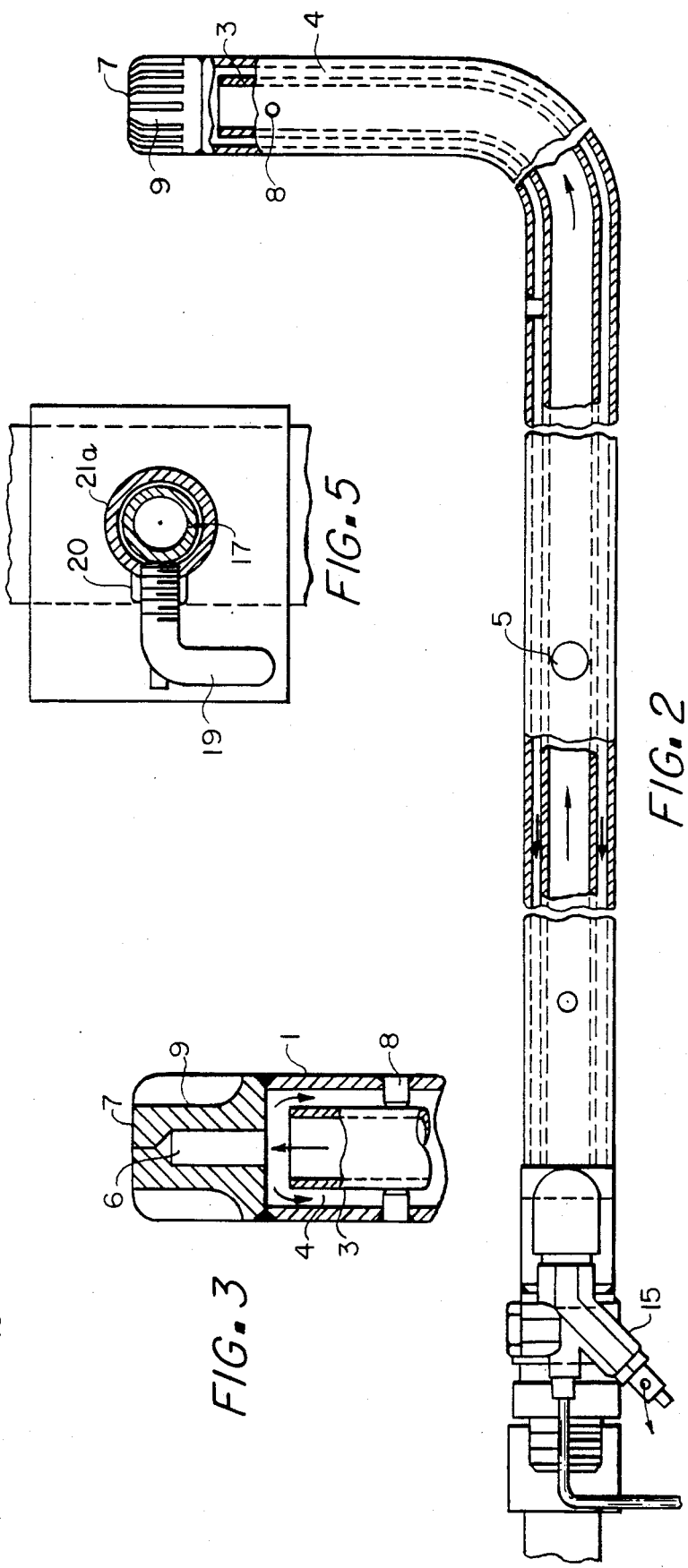

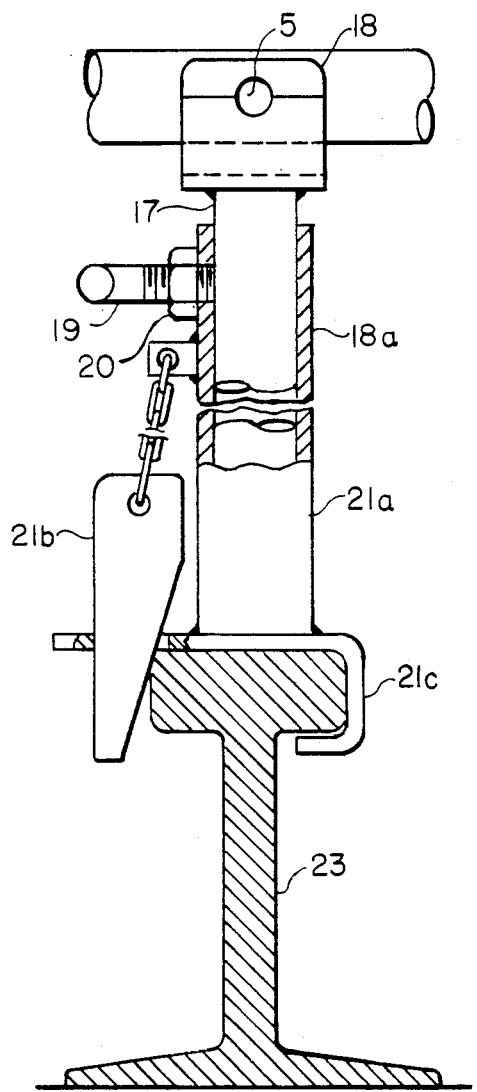
FIG. 4
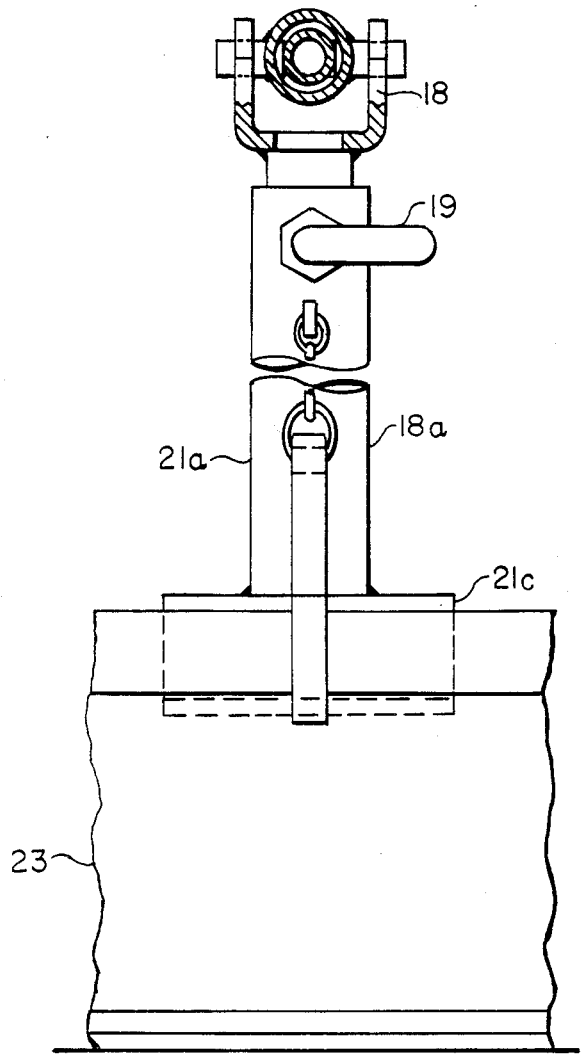
FIG. 6
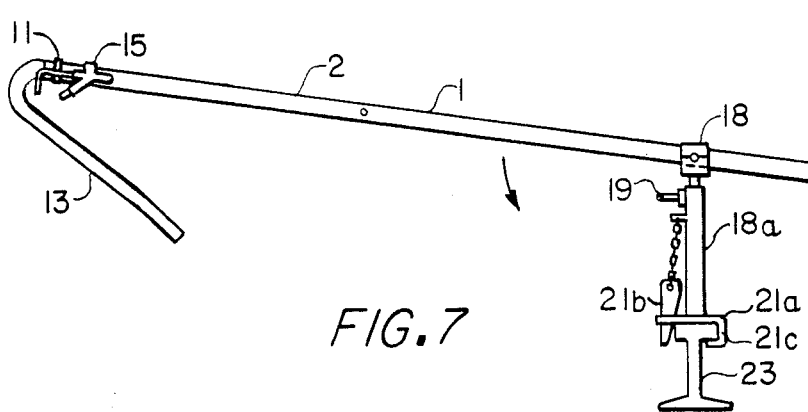
FIG. 7
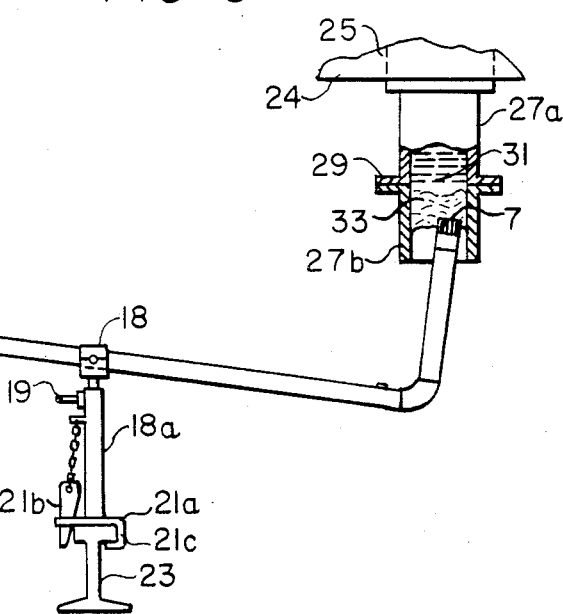

HEAT EXCHANGE APPARATUS USEFUL FOR MELTING SULFUR

BACKGROUND OF THE INVENTION

The present invention relates to a heat exchange apparatus which is useful for melting sulfur. The present invention when embodied as a steam lance for melting sulfur is especially useful to open the plugged outlet underneath a sulfur tank car containing molten sulfur. Prior to the present invention the plug of solid sulfur in the outlet underneath the sulfur car would be broken or dislogged by the manual use of a metal pick. Such practice was dangerous because once the plug of solidified sulfur melted it could cause the release of additional hot molten sulfur from the body of the outlet.

The invention can comprise a heat exchange apparatus comprising:
(a) tip means for contacting a material to be heated,
(b) conduit means for conducting heat exchanging fluid to, or to and from, said tip means, and
(c) pivot means disposed in an operative relationship therewith for pivotally supporting said conduit means to enable the application of force to said conduit means to urge said tip means against or into said material to be heated.

Although the apparatus is broadly useful for indirect heat exchange between any fluid heat exchange medium and any second material with which heat is to be exchanged to or from said fluid heat exchange medium, the invention is more specifically exemplified by an apparatus (sometimes termed herein a "steam lance") wherein steam is the fluid heat exchange medium.

An especially useful apparatus is a steam lance for melting solidified sulfur, particularly the plug of solid sulfur which commonly forms in the bottom outlet pipe of a railroad tank car or other transporting vehicle containing molten sulfur. Such an apparatus is sometimes termed herein "a sulfur steam lance" or a "sulfur lance".

The sulfur lance apparatus in this embodiment can comprise (a) a steam lance having a conduit means, sometimes hereinafter called a "body means" for containing super heated steam and water or condensate formed upon liquifaction of said steam and for conducting it away from the tip means, (b) a tip means for contact between said body means and the plug of solid sulfur to which heat is to be transfered to effect melting thereof; (c) connecting means to connect the body means to a source of steam and to remove condensate from said body means; (d) directing means (such as a conduit means) within said main body means to direct the steam from the connecting mains through the body means to the tip means and to direct condensate from the tip means through the body means to the connecting mains; and, (e) pivot supporting means attached to the body means to support the weight of the body means, the pivot means being located such that the body means is substantially counterbalanced in order that manual movement of the body portion causes the tip portion to enter a transporting vehicle and melt the solidified sulfur contained therein.

Preferably the tip means is relatively rigid or nonflexible and is disposed at an angle of less than 180° with respect to the main body portion, (i.e., substantially 90°) and further preferred, where the transporting vehicle is a railroad car, the pivot supporting means is attached to means for attaching the apparatus to a railroad rail.

U.S. Pat. No. 4,191,200 to Jagodzinski, et.al, discloses the broad concept of utilizing a steam heating probe to melt a solidified block of sulfur. In this patent, a plurality of such probes are inserted in holes drilled near the bottom of a sulfur storage block to melt the sulfur which is subsequently drawn off for use.

U.S. Pat. No. 4,203,625 of Ellithorpe, et.al, discloses a moveable heating element used to melt a solidified sulfur storage block. This heating element does not utilize a steam heated probe, but does use a counterweight system to move the heating element into the sulfur block as it melts.

U.S. Pat. No. 752,449 to Greenway, discloses an apparatus which is inserted into a railroad car to thaw out a frozen granular load to facilitate the unloading of the car. This device involves direct heat exchange contact between the steam or other heated fluid and the material to be heated. In contrast, the present invention involves indirect heat exchange between a fluid heat exchange medium and the material which is to be either heated or cooled, (in the case of sulfur, to be heated in order to cause it to melt).

U.S. Pat. No. 4,190,100 to Wallace, U.S. Pat. No. 2,232,272 to Rieger and U.S. Pat. No. 879,745 to Cooper, all show heated probe devices having means to transport the heating fluid, such as steam, to the probe tip and to return the low temperature steam or condensate to the heat source. In Cooper, this is achieved by placing a lateral wall across the hollow probe interior, while Rieger and Wallace utilize concentric tube arrangements. None of these patents, however, teach the use of such a probe to facilitate unloading of a railroad car or other transporting vehicle, nor do any show a prop having its tip oriented at an angle to the remainder of its body.

U.S. Pat. No. 392,844 to Best, discloses a spike-like device which is driven into a frozen load in a railroad car and consequently attached to a steam line. Openings along the steam spike allow the steam to pass into the load and melt or otherwise loosen it.

Super heated compressed air or a stream of water have also been used to reduce the viscosity of a railroad car load to facilitate its unloading. U.S. Pat. No. 3,500,900 to Kupka, shows a plurality of high pressure air nozzles located on a stand on either side of railroad car to project super-heated air into the car and reduce the viscosity of the load contained therein. U.S. Pat. No. 2,830,702 to Hagen, utilizes a nozzle means to direct water into a railroad car to facilitate the removal of grain or other granular substance contained therein.

U.S. Pat. No. 2,095,627 to Burns, discloses a hand manipulated device mounted on a pivoted support adjacent a railroad track for use in holding hoses to spray wash locomotives, railway cars and other relatively large and long objects. U.S. Pat. No. 2,981,484 to Hirsch, shows a hand manipulated steam gun which utilizes a spray of high temperature water or steam for cleaning heavy machinery and vehicles. U.S. Pat. No. 2,234,825 to Koppers shows a hand manipulated pipe for directing steam into a coke oven.

SUMMARY OF THE INVENTION

Broadly, the invention involves a heat exchange apparatus comprising:
(a) tip means for contacting a material to be heated or cooled, (b) conduit means for conducting heat exchanging fluid to, or to and from, said tip means, and (c) pivot means disposed in an operative relationship with the conduit means for pivotally supporting said conduit means to enable the application of force to said conduit means to urge said tip means against or into said material to be heated or cooled.

The invention can involve a heat exchange apparatus comprising:

(a) body means for containing a heat exchange fluid and also, preferably for conducting said fluid away from a tip means.

(b) tip means in fluid communication with said body means for contacting a second material;

(c) conduit means for connecting said body means to an external source of the heat exchange fluid; and (d) pivot means for supporting said body means and disposed in an operative relationship with said body means to enable the application of force to said body means to urge the tip means into said second medium.

In one embodiment, the heat exchange apparatus can comprise:

(a) tip means for contacting a material to be heated, (b) conduit means including first and second conduits for conducting heat exchanging fluid to and away from said tip means, and (c) pivot means for pivotally supporting said conduit means and disposed in an operative relationship therewith to enable the application of force to said conduit means on a portion thereof remote from a portion of the conduit means disposed between said pivot means and said tip means to urge said tip means against or into said material to be heated.

Preferably said tip means are configured to heat said second material by transfer of heat from said heat exchange fluid without contact of said fluid with said second medium; however the tip can also be configured (as with an orifice) to provide direct contact between the fluid and the second medium.

The pivot means for supporting said body means can be disposed in an operative relationship with said body means to enable the force of gravity to urge the tip means into said second medium, or can be disposed such that an external force (such as manual pressure) can move the tip up or down.

The apparatus also preferably has means of conducting said heat exchange fluid from said tip after said heat exchange fluid has changed temperature or phase (e.g., condensed steam) during heat exchange with said second medium.

The invention includes an apparatus for indirect heat exchange between a fluid heat exchange medium and a material, said apparatus comprising:

(a) an assembly comprised of (i) a body means for containing a heat exchange fluid and, connected to said body means, a tip means for contact between said body means and said material, (ii) connecting means to connect the body means to a source of said heat exchange fluid and to permit removal of said fluid from said body means, or to remove, from said body means, condensate or vapors produced during the indirect heat exchange, through said tip means, of said fluid with said material, (iii) directing means within said body means to direct said heat exchange fluid from the connecting means, through the body means to said tip means, and to direct said fluid, condensate or vapors from the tip means to the connecting means; and (b) pivot supporting means attached to said body means to support the weight of the assembly, the pivot means being located such that the assembly is substantially counter-balanced, or is unbalanced, such that the application of force to the end of the assembly opposed to the tip means causes the tip means to move toward or away from said second material.

In one embodiment the body means is adapted to contain a heat exchange fluid comprising steam and the connecting means include means for removing spent steam or condensate or mixtures of spent steam and condensate from the body means. For example, in one embodiment the body means comprises a hollow cylinder having a high ratio of length to diameter and said connecting means includes a smaller diameter concentric cylinder placed within said body means and which is connected at one end to a source of steam and at the other end to said tip means, the tip means providing an opening between said inner cylinder and the space between the interior of said body portion and the exterior of said concentric cylinder; thereby enabling steam to enter the inner cylinder, contact the tip and, after exchanging heat with the tip, the lower temperature steam and/or condensate is able to be removed from the body by traveling through the opening between in the tip and the space between the internal concentric cylinder and the internal wall of said hollow cylinder.

In another embodiment, which is useful for penetration of pipes or other orifices which are plugged by a meltable solid (such as wax, ice or sulfur), the tip means is disposed at an angle of less than 180° with respect to the body means (e.g., about between 90° and 180°, or about 90°). Another embodiment provides that the pivot supporting means is attached to the assembly such that the tip means is disposed to thrust upward against the second medium (for example, the second medium could be solid wax, ice or sulfur in a pipe, such as the outlet of a tank car).

In a preferred embodiment, an apparatus for melting solidified sulfur in a pipe or a transporting vehicle comprises:

(a) a steam lance having a body portion and a tip portion, the tip portion being disposed at an angle of less than 180° with respect to the body portion;

(b) connecting means to connect the body portion to a source of steam and to remove condensate, lower temperature steam, or mixtures thereof, therefrom;

(c) directing means within said steam lance to direct the steam from the connecting means through the body portion to the tip portion and to direct spent steam and/or condensate from the tip portion to the connecting means; and (d) pivot supporting means attached to the body portion to support the weight of the steam lance, the pivot means being located such that there is a thrust provided to the tip portion to cause it to enter the transporting vehicle or pipe and melt the solidified sulfur contained therein.

This embodiment is especially useful when the pivot supporting means are attached to a clamp means adapted to be attached to a railroad rail, in order to enable the steam lance to be fixed to a railroad rail with the tip up against the open bottom of the outlet pipe of a railroad car containing sulfur and the pivot means being such that, as the sulfur in the pipe melts, the upward thrust on the tip causes it to move upward through the pipe until it encounters, or passes, a valve means within the pipe.

Although the present invention describes a pivoted steam lance which can be attached to a railroad rail or other solid support and which has a solid tip, thereby providing indirect heat exchange, a modification of this device can be made whereby the tip has openings to enable steam or other heat exchange liquid to directly contact the medium to be either heated or cooled by the heat exchange fluid.

It can thus be seen that an especially useful embodiment of an apparatus for providing indirect heat exchange between a fluid heat exchange medium and a material to be heated or cooled, is an apparatus comprising:

(a) an assembly comprising
(i) tip means for contacting a material to be heated or cooled,
(ii) conduit means comprising a first conduit means for conducting a heat exchanging fluid to said tip means and a second conduit means for conducting said heat exchanging fluid or condensate or vapors away from said tip means,
(iii) connector means for connecting said first conduit means to a source of said heat exchanging fluid,
(iv) discharge means in said second conduit means for removal of said heat exchanging fluid or condensate or vapors from said second conduit means,
(b) pivot means attached to said conduit means for supporting said assembly at a point on said conduit means intermediate said connector means and said tip means so that said assembly is substantially balanced on said pivot means and so that the application of force to said assembly opposite to said tip means can cause said tip means to move toward or away from said material to be heated or cooled, depending on the direction of application of such force.

In the apparatus, said conduit means can comprise a first relatively non-flexible or relatively rigid section leading from said connector means and having an end remote from said connector means, and a second relatively non-flexible or relatively rigid section connecting said tip means to said first section at the remote end, said first section making an angle less than 180° with said second section. The apparatus of the pivot means can be attached to said assembly at a point which causes said tip means to be urged upwardly against said material to be heated or cooled.

BRIEF DESCRIPTION OF THE DRAWINGS

FIG. 1 is a schematic top view of a sulfur lance which is adapted for melting solidified sulfur in the outlet pipe of a railroad tank car containing molten sulfur.

FIG. 2 is a schematic side view of the steam lance of FIG. 1.

FIG. 3 is a cross section view of the tip of the steam lance showing how it is connected to the main body of the lance and configured such that steam and condensate enter the tip, then are withdrawn through the annular space formed between the concentric inner steam delivery pipe and the interior wall of the outer member.

FIG. 4 is a schematic view of a means of adjusting the height of the steam lance tip relative to the bottom of the tank car.

FIGS. 5 and 6 are, respectively, schematic side and front views of the means for clamping the lance and pivot support to a railroad rail.

FIG. 7 is a schematic side view of the entire sulfur steam lance apparatus showing the tip inserted in the outlet pipe of a sulfur tank car.

FURTHER DESCRIPTION OF THE INVENTION

When sulfur, such as that used for the manufacture of sulfuric acid, is loaded into rail tank cars for shipment, it is in a hot, liquid form. During the trip and while waiting to be unloaded the sulfur begins to solidify.

A continuing problem that is faced when unloading such rail tank cars is that a solid plug of sulfur blocks the outlet underneath the car. This plug, in the past, has been removed by manually picking at the plug or by using a hand-held source of steam. Both of these methods have several disadvantages. They put the operator both in a hazardous place under the car and in an uncomfortable position. The operator has to stay there until the outlet is free of the plug.

The present invention permits a portable, self-acting steam lance which pivots on the railroad track and is balanced in such a way that, as the tip melts the sulfur plug, gravity pushes the lance tip further into the plug. This enables the operator to set the device in place and walk away to attend to other duties and not to be exposed to the hazards underneath the car.

Preferably the lance has a height adjustment to accommodate different designs of rail tank cars. The angle between the tip and the main body of the lance and the length of the tip of the lance are generally designed for the unloading of a specific type of rail tank car. However, the tip can be designed so as to have an adjustable angle.

When used as a steam lance for unplugging the bottom valve of a sulfur tank car, the steam lance is fixed to a railroad rail, as by a clamp means at one end of a pivot member, the other end of which is positioned such that the body of the lance is supported and there is a positive thrust at the tip of the lance. Although indirect heat exchange is preferred (wherein the tip confines the heat exchange fluid and prevents direct contact of fluid with the second medium), in some applications an orifice can be put in the tip of the lance to enable steam to directly contact the material being heated. In one embodiment, the tip is positioned at a right angle to a part of the lance which is attached to the pivot member.

In operation, the tip is placed at the bottom outlet of a railroad tank car, and the clamp on the pivot member is attached to one of the iron railroad rails. Steam from an external source, such as a steam hose, enters the lance and upon reaching the tip of the lance heats it to enable the tip to melt the solid plug of sulfur in the tank car outlet, and as the sulfur melts, the thrust provided to the tip of the lance causes the tip to advance further into the outlet until the entire sulfur plug has been melted.

FIG. 1 is a top view of the steam lance 2, which comprises a main body 1, the interior of which contains a steam delivery pipe 3, which is held within the main body by members 5 and 8. The tip 7 of the lance has grooves 9 so as to provide a large surface for heat exchange. At the other end of the lance there are connecting means 11 to enable the lance to be connected to a steam hose 13. At the same end there is also a valve means 15 for removing from the lance body, condensate which forms when the steam cools as it travels from the hose through the steam delivery pipe to the tip and back through the annular space between the steam delivery pipe and the internal walls of the main body back to the opposite end of the lance. Usually the body of the lance is covered with an insulation material, such as asbestos cloth (not shown) to prevent operator burns and to lower heat loss.

FIG. 2 is a side view of the steam lance of FIG. 1 and shows that the tip of the lance is at about a 90° angle to the main body of the lance.

FIG. 3 illustrates in cross section the relationship between the tip 7 the wall of the main body 1 and the steam pipe 3, whereby an annular space 4 is provided between the inner wall of the main body and the steam pipe, to permit the steam to travel from the interior of the steam pipe to an interior chamber 6 of the tip, thereby heating the tip 7. The heat depleted steam (which can contain condensate) leaves chamber 6 of the tip and flows through the annular space 4 until it exits from valve means 15.

FIG. 5 shows a clamp means 18a for raising and lowering the lance tip, relative to the railway tank car. This means comprises a set screw 19 which moves within a nut 20, welded to the exterior wall of a vertical, cylindrical member 21a of a clamp means 18a for affixing the lance to a railroad rail. The set screw applies pressure to the outer wall of the vertical cylindrical portion 17 of a pivot support member 18.

FIGS. 4 and 6 are, respectively, side and front views of a rail clamp means 18a and pivot support member 18 which is attached in cut away to the main body of the steam lance, and show the pivot support member 18 attached, by means of a set screw 19 to a clamp means 18a comprised of a vertical cylindrical member 21a, a curved member 21c which can engage the railroad rail 23, and a fastening device 21b for holding the clamp means 18a to the rail 23.

FIG. 7 is a side view of the steam lance 2, comprised of the clamp means 18a, the members 5, the main body 1, the tip 7 and, at the other extremity of the body, the valve means 15 and a connecting means 11 to connect a steam hose 13 to the main body. With reference to FIG. 7, there is also shown a partial view of the bottom of a railway tank car 24 containing molten sulfur 25, the outlet pipe 27a, 27b of the railway tank 24, a valve means 29 for opening and closing the outlet pipe, molten sulfur 31 in the pipe and a plug of solid sulfur 33 which can be melted by opening a steam valve (not shown) to permit steam to enter the steam hose. The steam travels through the main body of the sulfur lance via the concentric steam delivery pipe (not shown) to heat the tip, whereby the heated tip transfers heat to the solid sulfur plug and, as the sulfur block melts, the force of gravity causes the tip to advance into the pipe 27b until the solid plug is melted and the molten sulfur 31 encountered.

It can be seen from the accompanying drawings as described above and the description herein that the present invention provides a convenient, inexpensive portable apparatus for melting the solid plug of sulfur found in a sulfur railroad tank car in a manner which is much safer than the prior art method of mechanically penetrating the solid block with a metal pick.

It should be further noted that the pressure of the steam which is commonly used to maintain sulfur molten in a sulfur tank car is an ideal source of steam for use with the sulfur lance, because this pressure is generally chosen such that it is at a temperature only slightly higher than the melting point of the sulfur. Similarly, it is advantageous to use indirect heating, such as is provided by the tip of the device described herein, rather than directly contacting the sulfur with live steam, because there is a risk of combustion of molten sulfur when the sulfur is exposed to live steam. Furthermore, the operation of the sulfur lance apparatus described herein provides a far better control of the temperature at the tip of the lance, with the indirect heat exchange, than would be provided by direct contact of the sulfur with live steam.

Another advantage is that the present device enables removal of the condensate or water formed during the heat exchange without having this water contact directly the molten sulfur.

A working model of the device described herein was fabricated from two pipes. One, the internal conduit, about ⅜" in diameter and 82 inches long, the threaded end of which was bended in a 90° angle, and a 1" diameter pipe, 66¼ inches long, with beveled ends for the main body of the pipe. A second piece of one inch diameter pipe 13¼ inches long held the melting tip, and a one inch diameter 90° ell fitting connected the two pieces of one inch pipe at the requisite 90° angle. At the opposed end of the one inch pipe main body assembly, a hole was made and a half inch, forged steel, half coupling was welded thereto and connected to a tilting disc steam trap. About an inch and half from the center of the half inch coupling, at the end of the body, a fitting was attached, by welding, in order to connect the lance to a steam hose. The pivot and clamp assemblies were constructed from readily available piping and metal substantially in accordance with the accompanying figures.

What is claimed is:

1. A heat exchange apparatus comprising:
    (a) cylindrical-shaped tip means having a first end for contacting a material to be heated or cooled, and a second end for contacting a heat exchange fluid, said tip means having a plurality of grooves extending partially radially inward from its outer cylindrical wall to provide a large surface for heat exchange, said tip means having an interior chamber open to said second end and extending towards said first end for receiving the heat exchange fluid,
    (b) conduit means for conducting heat exchanging fluid to said tip means, said conduit means bent to an angle of about 90° proximate to said tip means, and
    (c) means for pivotally supporting said conduit neans and disposed in an operative relationship therewith to enable the application of force to said conduit means to urge said tip means against or into said material to be heated or cooled.

2. A heat exchange apparatus comprising:
    (a) cylindrical-shaped tip means having a first end for contacting a material to be heated or cooled, and a second end for contacting a heat exchange fluid, said tip means having a plurality of grooves extending partially radially inward from its outer cylindrical wall to provide a large surface for heat exchange, said tip means having an interior chamber open to said second end and extending towards said first end for receiving the heat exchange fluid,
    (b) conduit means for conducting heat exchanging fluid to said tip means, said conduit means bent to an angle of about 90° proximate to said tip means, and
    (c) pivot means for pivotally supporting said conduit means and disposed in an operative relationship therewith to enable the application of force to said conduit means to urge said tip means against or into said material to be heated or cooled.

3. A heat exchange apparatus comprising:
    (a) cylindrical-shaped tip means having a first end for contacting a material to be heated or cooled, and a second end for contacting a heat exchange fluid, said tip means having a plurality of grooves extending partially radially inward from its outer cylindrical wall to provide a large surface for heat exchange, said tip means having an interior chamber open to said second end and extending towards said first end for receiving the heat exchange fluid, (b) conduit means for conducting heat exchanging fluid to said tip means, said conduit means bent to an angle of about 90° proximate to said tip means, and (c) pivot means for pivotally supporting said conduit means and disposed in an operative relationship therewith to enable the application of force to said conduit means on a portion thereof remote from: a portion of the conduit means disposed between said pivot means and said tip means to urge said tip means against or into said material to be heated.

4. The apparatus of claim 2 wherein said tip means are configured to heat said material to be heated or cooled by transfer of heat from said heat exchange fluid without contact of said fluid with said material to be heated or cooled.

5. The apparatus of claim 1 wherein said pivot means for pivotally supporting said conduit means are disposed in an operative relationship with said tip means to enable the force of gravity to urge the tip means against or into said material to be heated or cooled.

6. The apparatus of claim 1 including means of conducting said heat exchange fluid from said tip after said heat exchange fluid has changed temperature or phase during heat exchange with said material to be heated or cooled.

7. Apparatus for providing indirect heat exchange between a fluid heat exchange medium and a material to be heated, said apparatus comprising:
(a) an assembly comprising:
(i) cylindrical-shaped tip means having a first end for contacting a material to be heated or cooled, and a second end for contacting a heat exchange fluid, said tip means having a plurality of grooves extending partially radially inward from its outer cylindrical wall to provide a large surface for heat exchange, said tip means having an interior chamber open to said second end and extending towards said first end for receiving the heat exchange fluid,
(ii) conduit means connected to said tip means comprising a first conduit for conducting a heat exchanging fluid to the interior chamber of said tip means and a second conduit for conducting said heat exchanging fluid away from said tip means, and said conduit means bent to an angle of about 90° proximate to said tip means,
(iii) connector means for connecting said first conduit means to a source of said heat exchanging fluid, and
(iv) discharge means in and communicating with said second conduit means for removal of said heat exchanging fluid or condensate or vapors from said second conduit means; and
pivot means attached to said conduit means for supporting said assembly at a point on said conduit means intermediate said connector means and said tip means so that said assembly is substantially balanced on said pivot means and so that the application of force to said assembly on the side of said pivot means opposite to said tip means can cause said tip means to move toward or away from said material to be heated, depending on the direction of application of such force.

8. The apparatus of claim 7 wherein said conduit means comprises a first non-flexible section leading from said connector means and having an end remote from said connector means, and a second non-flexible section connecting said tip means to said first section at the remote end.

9. The apparatus of claim 7 wherein said pivot means is attached to said assembly at a point such that the weight of the assembly on the side of said pivot support means remote from said tip means is heavier than the weight of the assembly on the side of said prior support means proximate said tip means causing said tip means to be urged upwardly.

10. The apparatus of claim 1 wherein said tip means are configured to heat said material to be heated or cooled by transfer of heat from said heat exchange fluid without contact of said fluid with said material to be heated or cooled.

11. The apparatus of claim 2 wherein said pivot means for pivotally supporting said conduit means are disposed in an operative relationship with said tip means to enable the force of gravity to urge the tip means against or into said material to be heated or cooled.

12. The apparatus of claim 3 wherein said tip means are configured to heat said material to be heated or cooled by transfer of heat from said heat exchange fluid without contact of said fluid with said material to be heated or cooled.

13. The apparatus of claim 3 wherein said pivot means for pivotally supporting said conduit means are disposed in an operative relationship with said tip means to enable the force of gravity to urge the tip means against or into said material to be heated or cooled.

14. The apparatus of claim 1 wherein pivot means includes means for raising or lowering the vertical elevation of the apparatus.

15. The apparatus of claim 2 wherein pivot means includes means for raising or lowering the vertical elevation of the apparatus.

16. The apparatus of claim 3 wherein pivot means includes means for raising or lowering the vertical elevation of the apparatus.

17. The apparatus of claim 7 wherein pivot means includes means for raising or lowering the vertical elevation of the apparatus.

18. An apparatus for indirect heat exchange between a heat exchange fluid and a material to be heated, said apparatus comprising:
(a) cylindrical-shaped tip means having a first end for contacting a material to be heated or cooled, and a second end for contacting a heat exchange fluid, said tip means having a plurality of grooves extending partially radially inward from its outer cylindrical wall to provide a large surface for heat exchange, said tip means having an interior chamber open to said second end and extending towards said first end for receiving the heat exchange fluid,
(b) longitudinal conduit means connected to said tip means comprising a first conduit for conducting a heat exchange fluid to the interior chamber of said tip means at the open first end of said first conduit proximate said tip means and a second attached at its front end to and in fluid communication with said tip means for conducting said heat exchange fluid away from said tip means, said first conduit disposed coaxially within said second conduit to form an annular space means between said first conduit and the inner wall of said second conduit for the removal of said heat exchange fluid, said conduit means bent to an angle of about 90° proximate said tip means, (c) connector means attached to and in fluid communication with the second end of said first conduit opposite the end proximate to said tip means for connecting said first conduit to a source of said heat exchange fluid;

(d) discharge reans attached to and in fluid communication with the second end of said second conduit opposite the end attached to the tip means for removal of said heat exchange fluid from said second conduit;

(e) pivot means attached to said conduit means for pivotally supporting said apparatus at a point on said conduit means intermediate said tip means and said connector means so that said apparatus is in near balance about said pivot means with a bias from gravitational force toward raising said tip means rotationally upward about said pivot means, and (f) elevation means connected to said pivot means for raising and lowering the vertical elevation of said apparatus.

* * * * *